United States Patent [19]

Fishcher

[11] Patent Number: 4,770,580

[45] Date of Patent: Sep. 13, 1988

[54] EXPANSIBLE ANCHORING PLUG

[75] Inventor: Artur Fishcher, Tumlingen, Fed. Rep. of Germany

[73] Assignee: Fischerwerke, Tumlingen/Waldachtal, Fed. Rep. of Germany

[21] Appl. No.: 57,224

[22] Filed: Jun. 1, 1987

[30] Foreign Application Priority Data

Jun. 14, 1986 [DE] Fed. Rep. of Germany ....... 3620099

[51] Int. Cl.4 ............................................. F16B 13/06
[52] U.S. Cl. ......................................... 411/45; 411/54
[58] Field of Search .................................. 411/45–48, 411/54, 55, 57, 60, 78, 913

[56] References Cited

U.S. PATENT DOCUMENTS

| | | | |
|---|---|---|---|
| 4,073,212 | 2/1978 | Lerich | 411/54 |
| 4,611,963 | 9/1986 | Frohlich et al. | 411/54 |

FOREIGN PATENT DOCUMENTS

| | | |
|---|---|---|
| 7424831 | 7/1974 | Fed. Rep. of Germany . |
| 2424494 | 12/1975 | Fed. Rep. of Germany ........ 411/57 |
| 2701804 | 7/1978 | Fed. Rep. of Germany . |
| 7819231 | 12/1978 | Fed. Rep. of Germany . |
| 3117581 | 11/1982 | Fed. Rep. of Germany . |
| 2289789 | 5/1976 | France . |

Primary Examiner—Neill R. Wilson
Attorney, Agent, or Firm—Michael J. Striker

[57] ABSTRACT

An expansible anchoring plug for anchoring by impact in undercut pre-drilled holes, especially in holes which are widened towards their inner end, comprises an expansible sleeve which has an internal bore and which it is slotted over a part of its length and which can be anchored by driving it onto an expander body provided with an expander cone located at the bottom of the pre-drilled hole. The expander body is provided with a tubular extension engageable in an internal bore of the expansible sleeve. The end of the extension, once the expansible sleeve has been driven onto the expander body, is located in an enlarged portion of the internal bore of the expansible sleeve and is secured therein by a wedge.

3 Claims, 1 Drawing Sheet

EXPANSIBLE ANCHORING PLUG

BACKGROUND OF THE INVENTION

The present invention relates to an expansible anchoring plug for anchoring in pre-drilled holes by impact. More particularly, the invention relates to anchoring plugs to be anchored in pre-drilled holes having a widened undercut portion.

Expansible anchoring plugs of the foregoing type comprise an expansible sleeve which has an internal bore and which also has elongated slots over the part of its length, which slots form expansible segments, and an expander body, normally of conical shape. The expansible sleeve can be anchored in the pre-drilled hole by driving it the expander body which is positioned at the bottom of the drilled hole.

Expansible anchoring plugs anchored in a support structure, such as a wall, and receiving a screw for fastening an article to the support structure of the type under discussion have been disclosed in some applicant's U.S. patents, for example U.S. Pat. No. 4,185,536.

An expansible fixing plug of the foregoing type for anchoring by impact has been also disclosed in German Offenlegungsschrift No. 31 71 581. Compared with expansible anchoring plugs for anchoring by impact which are anchored by driving an expander pin from the front end through an internal bore of the expansible anchoring plug, driving an expansible sleeve onto an expander body located at the bottom of the pre-drilled hole has the advantage that the maximum size of the expander body can correspond to the diameter of the cylindrical portion of the pre-drilled hole formed in the anchoring material. A considerably higher degree of expansion is thus achieved, which, when such an expansible anchoring plug for anchoring by impact is anchored in a drilled hole, which is flared or widened at the bottom, is required for this widened undercut portion to be filled up. The mating fit of the expansible anchoring plug, which can thereby be achieved in this widened undercut portion results, on the one hand, in considerably higher holding values and, on the other hand, in an increased reliability, particularly in case if any cracks run through the hole in the supporting structure.

Inasmuch as theexpansible sleeve is less securely braced in an undercut hole of the support structure, and since the expander cone tapers towards the bottom of the pre-drilled hole, the expansible segments may, however, be pulled off the expander cone by a tractive force acting on the expansible sleeve. The increased holding force can therefore only be achieved if this slipping-off be prevented.

SUMMARY OF THE INVENTION

It is an object of the present invention to provide an improved expansible anchoring plug.

It is another object of the invention to provide an expansible plug to be anchored by impact, which is inexpensive to manufacture, easy to fit and which would also have high holding values and meet stringent safety requirements.

These and other objects of the invention are attained by an expansible anchoring plug to be anchored by impact in a pre-drilled hole having a widening undercut portion and provided in a support structure, the plug comprising an expansible sleeve having an internal bore and provided with a slotted expansible portion over a part of the length thereof; an expander body having an expander cone positioned at a bottom of said undercut portion of said hole, said sleeve being anchored in said hole by driving said sleeve onto said expander body by impact, said expander body being formed with a tubular extension engageable in said internal bore of said expansible sleeve, said internal bore having an enlarged portion; and a wedge provided on said tubular extension, said tubular extension having an end facing away from said expander cone, said end being inserted into said enlarged portion once said expansible sleeve has been driven onto said expander body and being expanded and secured in said expansible sleeve by said wedge.

To anchor the expansible anchoring plug according to the invention in a support structure, for example of concrete or the like, the plug is inserted into the pre-drilled hole having an undercut portion until the insertion end of the expander body is located against the bottom of the drilled hole. Thereafter, by blows on the end face of the expansible sleeve, either with a striking tool chucked in a hammer drill or with a hammer, the expansible sleeve is driven onto the expander body resting against the bottom of the drilled hole. As the hammering takes place, the expansible segments of the slotted portion of the expansible sleeve penetrate into the undercut of the pre-drilled hole and, together with the expander body, produce a mating fit in the undercut portion which is normally unaffected by the formation of cracks. The end of the tubular extension arranged on the expander body is displaced into the enlarged portion of the internal bore of the expansible sleeve as this is being driven on the expander body. Using a spigot with a point or by driving the wedge into the internal bore of the tubular extension of the expander body, the end of the extension is expanded to form a protuberance which fixes the expanded position of the expansible sleeve on the expander body. If the expansible sleeve is now subjected to a tractive force the expander body is pulled with it so that there is no reduction in the degree of the expansion.

The wedge may be pre-mounted in a bore of said tubular extension. A pre-mounted wedge not only facilitates installation, but also assists the expansion of the tubular extension by the wedge, so that even at maximum loads there is no need to fear that the expansible sleeve anchor will be pulled off the expander body.

The wedge may have a conical portion extending outwardly from said tubular extension in a pre-mounted position thereof, said conical portion being driven into the tubular extension to expand said end of said expander body.

The objects of the invention are also attained by an impact tool for anchoring an expansible plug in a pre-drilled hole having a widening undercut portion and formed in a supporting structure which plug includes an expansible sleeve having a tubular extension, an expander body on which said sleeve is driven by the impact tool and which has a wedge for securing said expander body to said sleeve, said impact tool including a stepped portion which has an end face and is engaged in an enlarged portion of an internal bore of said expansible sleeve, said wedge reacting against said end face of said stepped portion as said expansible sleeve is driven onto said expander body by the impact tool. Using such an impact tool, the expansible sleeve is driven onto the expander body and the tubular extension is "riveted" in the expansible sleeve in one operation.

The novel features which are considered as characteristic for the invention are set forth in particular in the appended claims. The invention itself, however, both as to its contruction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
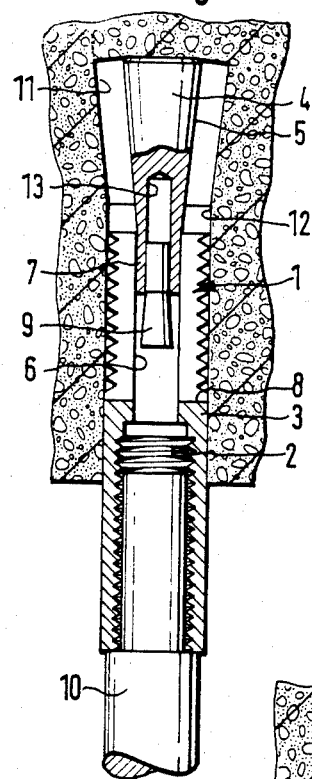
FIG. 1 is an axial sectional view of the anchoring plug of the invention inserted in a bore hole of an anchoring material in a non-expanded state.

Referring now to the drawings in detail, reference numeral 1 designates an expansible anchoring plug which is anchored in a pre-drilled hole by impact. The anchoring plug includes an expansible sleeve 3 which has an internal thread 2, and an expander body 4 which has an expander cone 5. The expander body 4 is provided with a tubular extension 7 which has an internal bore 13 and is engageable in an internal bore 6 of the expansible sleeve 3. The expansible sleeve 3 has in the conventional fashion an expansible portion formed by slits or slots 8 which subdivide the leading end portion of the expansible sleeve 3 into a plurality of segments as known. The internal bore 6 at the portion thereof behind the expansible portion of sleeve 3, widens to the cone diameter of the internal thread 2. A conical wedge 9 is inserted into the tubular extension 7 so that the end of the wedge extends outwardly from the tubular extension 7.

Figure 2:
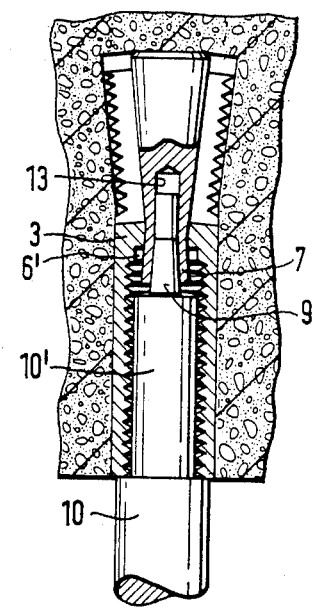
FIG. 2 is an axial sectional view of the anchoring plug of FIG. 1 in the expanded state.

Reference numeral 10 designates an impact tool which has an attachment 10'. In order to anchor the anchoring plug 1 in the material of a supporting structure provided with a pre-drilled hole having at the internal end a radially widening portion the expansible anchor 3 is driven on the expander body 4 which is positioned at the bottom of the drilled hole by using the impact tool 10. The expansible segments formed by slots 8 are thereby bent over the expander cone 5 and slide into the V-shaped widening undercut portion 11 of the drilled hole 12 so that sleeve 3 together with the expander body 4 matingly fit in the undercut portion 11. During the driving-in process, the end of the tubular extension 7 with the wedge 9 positioned thereon moves into an enlarged portion 6' of the internal bore 6 of the expansible sleeve 3. Before the expansion operation is finally complete the wedge 9 strikes against the end of an attachment 10' of the impact tool 10, which is positioned in the internal bore 6 of sleeve 3 so that during the last part of the driving-in operation wedge 9 is also simultaneously driven into the internal bore 13 of the tubular extension 7. Wedge 9 therefore expands the end of extension 7 to such an extent that the expander body 4 is securely fastened to the expansible sleeve 3 in the manner similar to that of a rivet. Even if the expansible sleeve 3 is subjected to considerable pulling forces it would be impossible for it to be pulled off the expander body 4. FIG. 2 illustrates the assembly of the anchoring plug in the expanded condition.

Figure 3:
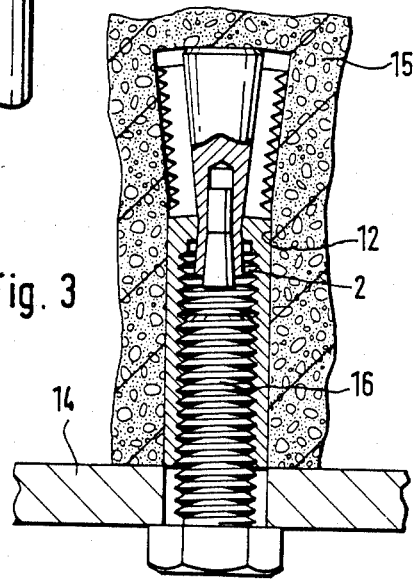
FIG. 3 is an axial view of the plug of the invention with an article fixed thereby.

Referring now to FIG. 3, it will be seen that in order to fasten an article 14 to the material 15 of support structure, for example concrete, a fastening screw 16 is screwed into the thread 2 of the expansible sleeve 3, which in assembly with the expander cone 4 provided with wedge 9 inserted into the tubular extension 7 and extended into the expansible sleeve 3, have been anchored by impact of tool 10 in the drilled hole 12 provided with the widening undercut portion 11 as described hereinabove.

It will be understood that each of the elements described above, or two or more together, may also find a useful application in other types of expansible anchoring plugs differing from the types described above.

While the invention has been illustrated and described as embodied in an expansible anchoring plug, it is not intended to be limited to the details shown, since various modifications and structural changes may be made without parting in any way from the spirit of the present invention.

Without further analysis, the foregoing will so fully reveal the gist of the present invention that others can, by applying current knowledge, readily adapt it for various applications without omitting features that, from the standpoint of prior art, fairly consitute essential characteristics of the generic or specific aspects of this invention.

What is claimed as new and desired to be protected by Letters Patent is set forth in the appended claims; I claim:

1. An expansible anchoring plug to be anchored by impact in a pre-drilled hole having a widening undercut portion and provided in a support structure, the plug comprising an expansible sleeve having an internal bore and provided with a slotted expansible portion over a part of the length thereof; an expander body having an expander cone positioned at a bottom of said undercut portion of said hole, said sleeve being anchored in said hole by driving said sleeve onto said expander body by impact, said expander body being formed with a tubular extension engageable in said internal bore of said expansible sleeve, said internal bore having an enlarged portion; and a wedge provided on said tubular extension, said tubular extension having an end facing away from said expander cone, said end being inserted into said enlarged portion once said expansible sleeve has been driven onto said expander body and being expanded and secured in said expansible sleeve by said wedge.

2. The plug as defined in claim 1, wherein said wedge is pre-mounted in a bore of said tubular extension.

3. The plug as defined in claim 2, wherein said wedge has a conical portion extending outwardly from said tubular extension in a pre-mounted position thereof, said conical portion being driven into said tubular extension to expand said end of said expander body.

* * * * *